Patented Apr. 4, 1939

2,153,445

UNITED STATES PATENT OFFICE 2,153,445

PROCESS OF PREPARING STARCH PASTES

John J. Willaman, Robert A. Diehm, and Edward W. Clark, Bristol, Pa., assignors to Röhm & Haas Company, Philadelphia, Pa.

No Drawing. Application April 21, 1936, Serial No. 75,548

17 Claims. (Cl. 195—114)

This invention relates to a process of preparing starch pastes suitable for use as adhesives and as size for textiles and paper. It is an improvement in those processes of preparing starch paste that are based on enzyme action to modify the starch.

A paste made from raw starch unmodified in any way is unsuitable for most sizing and adhesive purposes. It is highly viscous per unit of concentration and gives a harsh, brittle finish that is generally undesirable. In a paste of workable viscosity, the concentration of starch is too low to give proper sizing or adherence. Hence, it has been found desirable in commercial processes of preparing sizes and adhesives to modify the raw starch and increase its water solubility whereby a less viscous paste of suitable concentration is obtainable. The three common modifying processes can be classified generally as (1) by treatment with acids; (2) by treatment with chlorine; and (3) by the action of the enzyme diastase. The present invention is an improvement in the third method.

In the enzyme process as commonly conducted, a mixture of starch and water is heated to or somewhat above the gelatinization temperature of the starch employed, and then cooled to the temperature best suited for the particular enzyme used. Thereafter the enzyme is added and allowed to act until the viscosity of the paste is reduced to the desired point. The action of the enzyme is stopped by raising the temperature to the point where the enzyme is destroyed. This process has two distinct disadvantages—the necessity of cooling the paste which requires time and attention, and the difficulty in getting the enzyme thoroughly distributed throughout the gelatinized starch.

It has been proposed to obviate these disadvantages by incorporating the diastase with the starch and water before heating to the gelatinization temperature and maintaining the temperature at that point during the action of the enzyme. Such a process is possible, but very uneconomical of enzyme. Tapioca starch gelatinizes at about 63° C., wheat and potato starch at about 65-68° C., and corn starch at about 72-74° C., temperatures that are from 10-30° C. above the optimum for most diastases. Some of them will act at these temperatures for a short time but are so quickly destroyed that economically prohibitive quantities of enzyme must be used if the proper degree of modification is to be attained.

The object of the present invention is the development of a practical and economical process of preparing a starch paste suitable for sizing and adhesive purposes by the action on diastatic enzymes on starch. More specifically the object of the invention is the development of a process that will permit the economical use of diastatic enzymes at the gelatinization temperature of starch. These objects we have attained through our discovery of a new class of activating and protecting agents which greatly enhance the activity of diastase at any temperature and especially at the unfavorably high temperatures described above. We have found that very small quantities of inorganic oxidizing agents that will react with water to liberate oxygen, such as the alkali and alkaline earth metal and ammonium salts of perboric, hypochlorous and persulphuric acids, and the alkaline earth metal peroxides, when added to a mixture of starch, diastase and water give from three to five times the activity of diastase that is obtained in their absence. Sodium chloride and the soluble salts of calcium are known as activating and protecting materials for diastase. The action of the above oxidizing agents is in addition to and independent of the protective action of calcium and sodium salts and may be used either alone or in combination with these known protecting agents. By the use of our protecting agents the quantity of diastase required in the making of suitable size at the gelatinization temperature of starch is reduced to an amount which is economically feasible.

In carrying out the invention any raw starch is finely powdered and added to water in the desired proportion, depending upon the use to which the paste is to be applied. The starch and water mixture should preferably be slightly acid, such as obtains with the usual commercial starch and the usual sources of water. If either the starch or the water is more than slightly alkaline, the mixture is preferably brought to a slightly acid condition. At this stage of the process the water should be maintained at a temperature below the gelatinization temperature of the starch. To the starch slurry thus obtained the desired quantity of enzyme and activating agent are added and thoroughly mixed. Any diastatic enzyme may be used. The choice will depend primarily on cost and availability, the quantity upon the degree of liquefaction desired and the type of starch employed. The mixture of water, enzyme, starch and activator is then heated while being thoroughly stirred, to the temperature at which the starch employed gelatinizes, and is maintained at that temperature until the desired degree of liquefaction is obtained. In applying the process commercially, it is desirable that the heating should not extend beyond a period of thirty minutes. The quantity of enzyme employed should be such that it will produce the desired liquefaction in that period. Shorter periods of treatment require an increase in the dosage of enzyme.

The exposure of any type of diastase to these temperatures for thirty minutes results in almost complete inactivation. This is especially true for pancreatic diastase and to a less degree, for fungus and malt diastases. It is nevertheless desirable in all cases, after proper liquefaction is obtained, to heat the mixture to 85° C. to insure complete inactivation of the enzyme. The bacterial enzymes are the most heat resistant of the diastases and when used a destructive temperature of 100° C. should be employed. In carrying out our process we prefer to use a malt or fungus diastase. The heat resistance of these enzymes is such that the degree of liquefaction can be closely controlled by adjusting the quantity of diastase preparation added. We prefer fungus diastase to malt because of its lower saccharifying action.

In the process as thus described the mixture of starch, water, enzyme and activator remains as a fluid slurry until the temperature of gelatinization is reached, at which point it suddenly becomes a thick, pasty mass. When this condition is reached stirring is stopped and heating discontinued. It is then that the enzymes begin to function and within a period of a few minutes begin to liquefy the starch to a point at which stirring can be resumed if desired.

The amount of oxidizing agent that should be added cannot be given in definite quantities as it depends upon the type of starch to be treated, the particular diastatic enzyme used, and the choice of oxidizing agent. For any given reaction mixture there is an optimum concentration for each oxidizing agent. If more or less than this optimum amount is used, less diastatic action results. This optimum concentration of oxidizing agent for any given mixture can readily be determined by a few preliminary tests measuring the effect that different amounts of oxidizing agent have upon the enzyme activity of the preparation. Such measurements can be made by any of the standard methods of measuring enzyme activity. The table summarizes the results obtained by a number of such tests on different mixtures. Besides showing how different concentrations of oxidizing agent affect the activity of the enzymes, it illustrates the magnitude of the increased activity obtainable by our new class of stabilizers. These activities were determined by measuring the drop in viscosity of a starch paste over measured periods of time due to the action of the diastase, a principle often used in measuring various enzyme activities. The measurements were made at temperatures varying from 60–75° C. The figures given for relative activity are compared to an arbitrary figure of 100 given to the action of each enzyme in the absence of activator.

Table

| No. | Starch | Enzyme | Activator Kind | Amount per 100 gm. starch mg. | Relative diastatic activity |
|---|---|---|---|---|---|
| 1 | Tapioca | Fungus | Sodium perborate | 33 | 150 |
|  |  |  |  | 132 | 470 |
|  |  |  |  | 165 | 350 |
| 2 | do | do | Calcium peroxide | 33 | 348 |
|  |  |  |  | 50 | 410 |
|  |  |  |  | 132 | 193 |
| 3 | do | do | Magnesium peroxide | 33 | 340 |
|  |  |  |  | 66 | 300 |
|  |  |  |  | 100 | <100 |
| 4 | do | do | Calcium hypochlorite | 33 | 160 |
|  |  |  |  | 66 | 215 |
|  |  |  |  | 132 | 120 |
| 5 | do | Malt | Calcium peroxide | 16 | 268 |
|  |  |  |  | 33 | 336 |
|  |  |  |  | 50 | 291 |
| 6 | Corn | do | do | 66 | 140 |
|  |  |  |  | 132 | 160 |
|  |  |  |  | 264 | 165 |
|  |  |  |  | 66 | 147 |
| 7 | do | do | Sodium perborate | 132 | 190 |
|  |  |  |  | 264 | 119 |
| 8 | do | do | Magnesium peroxide | 33 | 168 |
|  |  |  |  | 66 | 173 |
|  |  |  |  | 132 | 57 |
| 9 | do | Fungus | Sodium perborate | 33 | 205 |
|  |  |  |  | 66 | 130 |
| 10 | Tapioca | Pancreatic | do | 36 | 116 |

The following specific examples are given to illustrate our invention. They are given for purposes of illustration only and should not be construed as limiting the invention.

*Example 1.*—200 grams of powdered raw corn starch were stirred into 800 cc. of water. 0.61 gm. of a fungus diastate preparation and 0.2 gram of calcium peroxide were added and thoroughly mixed in. The temperature was then raised to 72° C. and held there for 30 minutes, the stirring being discontinued when the starch gelatinized. At the end of this time, the mixture was heated to and held for five minutes at 85° C. to insure complete inactivation of the enzyme.

The viscosity of the resulting paste was measured in a viscometer pipette at 80° C. and had an outflow time of 12 seconds. In a similar run in which no oxidizing agent was present, the resulting paste had an outflow time of 100 seconds.

*Example 2.*—A mixture of 200 gm. of powdered raw starch, 800 cc. of water, 3 grams of active malt extract and 0.4 gram of sodium perborate was prepared and treated as in Example 1. The outflow time of the resulting paste was 10 seconds as compared with an outflow time of 50 seconds for a paste prepared under identical conditions except that no oxidizing agent was used.

*Example 3.*—200 grams of powdered tapioca starch were stirred into 800 cc. of water. 0.06 gram of a fungus diastase preparation and 0.1 gram of sodium perborate were added. The temperature was then raised to 70° C., held there for 30 minutes and then raised to 85° C. A control paste was prepared under the same conditions, omitting the oxidizing agent. This control paste had an outflow time of 52 seconds as compared with 31 seconds for the paste prepared in the presence of the oxidizing agent.

In a similar run in which 0.01 gram ammonium persulphate and 0.008 gram of sodium bicarbonate (to counteract the acidity produced by the ammonium persulphate) were substituted for the sodium perborate, a paste was obtained having an outflow time of 45 seconds.

*Example 4.*—200 gm. raw powdered corn starch, 2.85 gm. bacterial diastase preparation, 0.05 gm. sodium perborate and 800 cc. of water were thoroughly mixed, heated while stirring to 80° C., held at this temperature for 30 minutes, heated at 93° C. for 10 minutes to inactivate the enzyme, cooled to 80° C. and the viscosity measured in a viscometer pipette. The outflow time was 13 seconds. In a similar run, in which no oxidizing agent was present, the outflow time was 43 seconds.

*Example 5.*—200 gm. raw powdered corn starch, 0.40 gm. fungus enzyme preparation, 0.4 gm. calcium acetate monohydrate, 0.2 gm. calcium peroxide and 800 cc. of water were mixed, heated while stirred to 72° C., held at this temperature for 30 minutes, heated at 85° C. for 5 minutes to inactivate the enzyme, cooled to 80° C. and is viscosity measured. The outflow time was 24 seconds. In a similar run, in which no calcium peroxide was added the outflow time was 42 seconds.

In carrying out our process, it is important to select an inorganic oxidizing agent that reacts with water to liberate oxygen. Other typical inorganic oxidizing agents, such as potassium permanganate, potassium chlorate, solium chromate and sodium dichromate, which do not react with water to liberate oxygen under the operating conditions described above, do not increase the action of the various diastases. It is also important to avoid adding too much of the useful oxidizing agents. We have found that excessive quantities of these agents instead of stabilizing the enzymes, tend to destroy them and reduce their activity. In the following claims the term "activating amounts" is intended to cover those quantities of oxidizing agents which when added to a reaction mixture, stabilize and increase the activity of the enzyme.

We claim:

1. In a process of preparing a starch paste by diastatic enzyme action the improvement which comprises incorporating in the reaction mixture an activating amount of an inorganic oxidizing agent that will react with water to liberate oxygen selected from the group consisting of the alkaline earth peroxides and alkali, alkaline earth and ammonium salts of hydrochlorous, persulphuric and perboric acid.

2. In a process of preparing a starch paste by diastatic enzyme action the improvement which comprises incorporating in the reaction mixture an activating amount of an alkaline earth metal peroxide.

3. In a process of preparing a starch paste by diastatic enzyme action the improvement which comprises incorporating in the reaction mixture an activating amount of a perborate.

4. In a process of preparing a starch paste by diastatic enzyme action the improvement which comprises incorporating in the reaction mixture an activating amount of sodium perborate.

5. In a process of preparing a starch paste by diastatic enzyme action wherein the reaction is carried out at the gelatinizing temperature of the starch, the improvement which comprises incorporating in the reaction mixture an activating amount of an inorganic oxidizing agent that will react with water to liberate oxygen selected from the group consisting of the alkaline earth peroxides and alkali, alkaline earth and ammonium salts of hypochlorous, persulphuric and perboric acid.

6. In a process of preparing a starch paste by diastatic enzyme action wherein the reaction is carried out at the gelatinizing temperature of the starch, the improvement which comprises incorporating in the reaction mixture an activating amount of an alkaline earth metal peroxide.

7. In a process of preparing a starch paste by diastatic enzyme action wherein the reaction is carried out at the gelatinizing temperature of the starch, the improvement which comprises incorporating in the reaction mixture an activating amount of a perborate.

8. In a process of preparing a starch paste by diastatic enzyme action wherein the reaction is carried out at the gelatinizing temperature of the starch, the improvement which comprises incorporating in the reaction mixture an activating amount of sodium perborate.

9. The process of preparing a starch paste which comprises forming a mixture of starch water, a diastatic enzyme and an activating amount of an inorganic oxidizing agent that reacts with water to liberate oxygen selected from the group consisting of the alkaline earth peroxides and alkali, alkaline earth and ammonium salts of hypochlorous, persulphuric and perboric acid, heating the mixture to the gelatinization temperature of the starch and, after the desired liquefaction is obtained, destroying the activity of the enzyme.

10. The process of preparing a starch paste suitable for sizing purposes which comprises forming a mixture of starch, water, a diastatic fungus enzyme, and an activating amount of an inorganic oxidizing agent that will react with water to liberate oxygen selected from the group consisting of the alkaline earth peroxides and alkali, alkaline earth and ammonium salts of hypochlorous, persulphuric and perboric acid, heating the mixture to the gelatinization temperature of starch, maintaining that temperature until the desired liquefaction is obtained, and then heating to about 80° C. until the enzyme is inactivated.

11. The process of preparing a starch paste suitable for sizing purposes which comprises forming a mixture of starch, water, a diastatic fungus enzyme, and an activating amount of an alkaline earth metal peroxide, heating the mixture to the gelatinization temperature of starch, maintaining that temperature until the desired liquefaction is obtained, and then heating to about 80° C. until the enzyme is inactivated.

12. The process of preparing a starch paste suitable for sizing purposes which comprises forming a mixture of starch, water, a diastatic fungus enzyme, and an activating amount of a perborate, heating the mixture to the gelatinization temperature of starch, maintaining that temperature until the desired liquefaction is obtained, and then heating to about 80° C. Until the enzyme is inactivated.

13. The process of preparing a starch paste suitable for sizing purposes which comprises forming a mixture of starch, water, a diastatic fungus enzyme, and an activating amount of sodium perborate, heating the mixture to the gelatinization temperature of starch, maintaining that temperature until the desired liquefaction is obtained, and then heating to about 80° C. until the enzyme is inactivated.

14. In a process of preparing a starch size by the action of a diastatic fungus enzyme at the gelatinization temperature of the starch, the improvement which comprises incorporating in the reaction mixture an activating amount of an inorganic oxidizing agent that will react with water to liberate oxygen selected from the group consisting of the alkaline earth peroxides and alkali, alkaline earth and ammonium salts of hypochlorous, persulphuric and perboric acid.

15. In a process of preparing a starch size by the action of a diastatic fungus enzyme at the gelatinization temperature of the starch, the improvement which comprises incorporating in the reaction mixture an activating amount of an alkaline earth metal peroxide.

16. In a process of preparing a starch size by the action of a diastatic fungus enzyme at the gelatinization temperature of the starch, the improvement which comprises incorporating in the reaction mixture an activating amount of a perborate.

17. In a process of preparing a starch size by the action of a diastatic fungus enzyme at the gelatinization temperature of the starch, the improvement which comprises incorporating in the reaction mixture an activating amount of sodium perborate.

JOHN J. WILLAMAN.
ROBERT A. DIEHM.
EDWARD W. CLARK.